US012606040B1

(12) United States Patent　　　　(10) Patent No.:　US 12,606,040 B1

Kathol　　　　　　　　　　　　　　　(45) Date of Patent:　Apr. 21, 2026

(54) COOLED ELECTRIC CHARGING SYSTEM AND ELECTRIC CABLE ASSEMBLY

(71) Applicant: CAES SYSTEMS LLC, Arlington, VA (US)

(72) Inventor: Bryan Kathol, Lakeside, CA (US)

(73) Assignee: CAES SYSTEMS LLC, Arlington, VA (US)

( * ) Notice: Subject to any disclaimer, the term of this patent is extended or adjusted under 35 U.S.C. 154(b) by 607 days.

(21) Appl. No.: 18/151,875

(22) Filed: Jan. 9, 2023

(51) Int. Cl.

| *B60L 53/302* | (2019.01) |
|---|---|
| *B60L 53/16* | (2019.01) |
| *B60L 53/18* | (2019.01) |
| *H01B 7/42* | (2006.01) |
| *H01R 13/00* | (2006.01) |
| *H01R 13/635* | (2006.01) |
| *H02J 7/70* | (2026.01) |

(52) U.S. Cl.
CPC ............. *B60L 53/302* (2019.02); *B60L 53/16* (2019.02); *B60L 53/18* (2019.02); *H01B 7/423* (2013.01); *H01R 13/005* (2013.01); *H01R 13/635* (2013.01); *H02J 7/751* (2026.01); *H01R 2201/26* (2013.01)

(58) Field of Classification Search
CPC .................................................... B60L 53/302
USPC ........................................................ 320/107
See application file for complete search history.

(56) References Cited

U.S. PATENT DOCUMENTS

| 5,349,137 A | 9/1994 | Cedrone |
|---|---|---|
| 5,909,099 A | 6/1999 | Watanabe et al. |

| 9,786,961 B2 | 10/2017 | Dyer et al. | |
|---|---|---|---|
| 10,515,742 B1 | 12/2019 | De Bock | |
| 10,861,619 B2 | 12/2020 | Lee et al. | |
| 11,590,855 B2 | 2/2023 | Wainwright | |
| 11,804,315 B2 | 10/2023 | Neumann | |
| 12,227,094 B2 | 2/2025 | Mochizuki et al. | |
| 2009/0256523 A1* | 10/2009 | Taguchi | B60L 53/18 165/104.11 |
| 2012/0043935 A1* | 2/2012 | Dyer | B60L 58/12 320/109 |
| 2013/0029193 A1* | 1/2013 | Dyer | H01M 10/486 180/65.21 |
| 2015/0217654 A1* | 8/2015 | Woo | B60L 53/18 320/109 |
| 2018/0013180 A1* | 1/2018 | Dyer | H01M 10/6567 |
| 2019/0190093 A1* | 6/2019 | Dyer | H01M 10/6557 |
| 2019/0341661 A1* | 11/2019 | Guerra | B60L 53/16 |

(Continued)

FOREIGN PATENT DOCUMENTS

DE　　　102019114765 B3 *　10/2020　............ B60L 53/302

OTHER PUBLICATIONS

Notice of Allowance and Fees Due (PTOL-85) Mailed on Jan. 29, 2026 for U.S. Appl. No. 18/178,967, 9 page(s).

*Primary Examiner* — Jerry D Robbins

(74) *Attorney, Agent, or Firm* — Alston & Bird LLP

(57) ABSTRACT

An electric cable assembly is provided. The electric cable assembly includes an electric cable and a connector. The connector includes an interface portion and a pivotable member. The interface portion includes an electrical interface and a fluid coupling. The pivotable member includes an arm that is configured to be engageable with the fluid coupling of the interface portion. The fluid coupling is configured to be removable from the fluid socket of the electric device or the charging station when the arm of the pivotable member is engaged with the fluid coupling.

20 Claims, 4 Drawing Sheets

(56)                        References Cited

U.S. PATENT DOCUMENTS

2022/0144112 A1*   5/2022   Bortolato ................ B60L 53/18
2022/0258629 A1*   8/2022   Hanchett ................. B60L 53/62

* cited by examiner

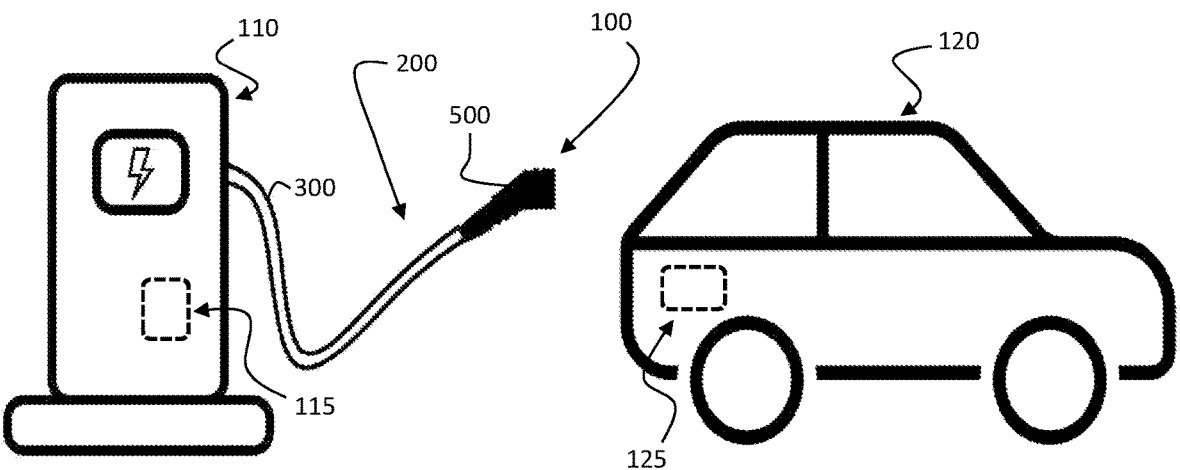
FIG. 1
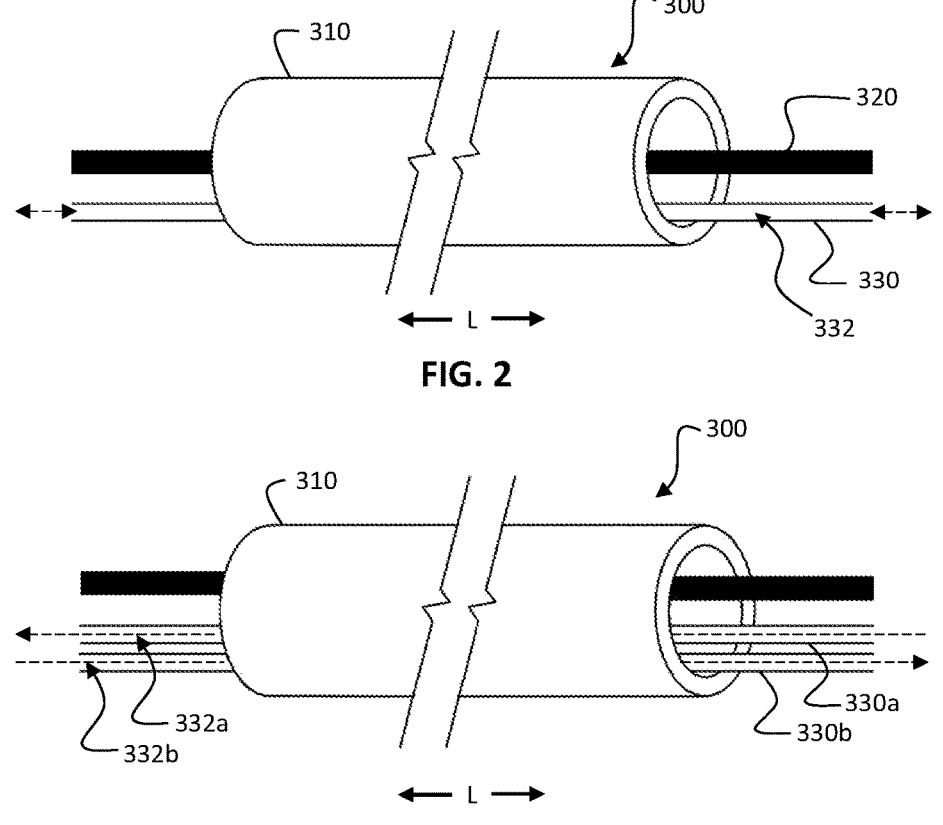
FIG. 2
FIG. 3

COOLED ELECTRIC CHARGING SYSTEM AND ELECTRIC CABLE ASSEMBLY

TECHNICAL FIELD

The present application relates generally to an electric charging system and an electric cable assembly for charging an electric device, such as an electric vehicle.

BACKGROUND

Electric charging systems are often used to recharge a battery of an electric device, such as an electric vehicle. It is often desirable to quickly recharge the battery of the electric device with the electric charging system. However, to increase the speed at which a battery recharges, the density of the current transmitted to the battery may need to be increased. Increasing the current density through the electric charging system and to the battery may cause an undesirable amount of heat to be generated within one or more components of the electric charging system (e.g., electric cables and/or electric connectors). Therefore, it would be beneficial to cool one or more components of the electric charging system. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved electric cable assemblies and improved electric charging systems for charging an electric device, such as an electric vehicle. In various examples, a fluid is allowed to flow to/from a charging station, through the electric cable assembly, and from/to an electric device. The fluid may absorb heat from and cool one or more components of the charging station, the electric cable assembly, or the electric device. In various examples, the fluid flows through a fluid coupling of the electric cable assembly when the fluid coupling is coupled to the electric device. The fluid coupling may be configured to prevent the fluid from flowing through the fluid coupling of the electric cable assembly when the fluid coupling is decoupled from the electric device. Preventing a fluid from flowing through the opening of the fluid coupling when the fluid coupling is decoupled from the electric device may, for example, increase the safety of the electric cable assembly or the electric charging system, reduce the negative environmental impact of the electric cable assembly or the electric charging system, and/or improve the user experience for the user using the electric cable assembly or the electric charging system.

In various aspects of the invention, an electric cable assembly includes an electric cable and a connector that is configured to be in electrical communication with the electric cable. The connector can include a handle portion, an interface portion, and a pivotable member. The interface portion can be coupled to or integral with the handle portion and can include an electrical interface and a fluid coupling. The fluid coupling can be configured to be removably coupled with a fluid socket of an electric device or a charging station.

In various examples, the pivotable member includes an arm. The arm can be configured to be engageable with the fluid coupling. When the fluid coupling is coupled with the fluid socket of the electric device or the charging station, the fluid coupling can be configured to be removable from the fluid socket of the electric device or the charging station when the arm of the pivotable member is engaged with the fluid coupling. When the fluid coupling is removed from the fluid socket of the electric device or the charging station, the fluid coupling can be configured to prevent a fluid from flowing through an opening of the fluid coupling.

In various examples, the fluid coupling is configured to be in a locked position when the fluid coupling is coupled with the fluid socket of the electric device or the charging station. When the fluid coupling is coupled to the fluid socket of the electric device or the charging station, the fluid coupling may prevent the fluid coupling from being decoupled with the electric device or the charging station. When the fluid coupling is coupled to the fluid socket of the electric device or the charging station, the fluid coupling may allow a fluid to flow through an opening of the fluid coupling. The fluid coupling can include an actuating member and the arm of the pivotable member can be configured such that when it is engaged with the fluid coupling, the arm of the pivotable member exerts a pushing force on the actuating member. In various examples, the electric cable includes a second fluid coupling configured to be coupled with a second fluid socket of the electric device or the charging station.

In various examples, the electric cable includes a biasing member to apply a pushing force to the pivotable member to automatically disengage the arm of the pivotable member from the fluid coupling. The biasing member can be positioned between the handle portion and the palm rest of the pivotable member.

In various examples, the pivotable member is pivotably coupled to the handle portion, the interface portion, or an area between the handle portion and the interface portion. The pivotable member can be a squeeze lever. In various examples, the pivotable member is configured to pivot on a pivot point. The arm of the pivotable member can include a first portion and a second portion, and an angle can be defined between the first portion and the second portion. The angle can be at least 45 degrees and up to 135 degrees. The arm of the pivotable member can include a contact portion. The contact portion can extend from the second portion and toward a centerline of the interface portion of the connector. In various examples, the fluid coupling includes an actuating member and the contact portion is configured to be engageable with the actuating member.

In various examples, the electrical interface is configured to be coupled with an electrical socket of the electric device or the charging station. The interface portion can include a plurality of interfaces, the plurality of interfaces can include the electrical interface and at least one of a second electrical interface, a communication interface, or a ground interface. Each of the plurality of interfaces can be configured to be coupled with a corresponding socket of the electric device or the charging station.

In various examples, the fluid coupling is configured to be slidingly engageable with the fluid socket of the electric device or the charging station and the electrical interface is configured to be slidingly engageable with an electrical socket of the electric device or the charging station.

In various aspects, an electric cable assembly includes an electric cable and a connector. The electric cable can include a sheath, an electric line positioned within the sheath, and a fluid line positioned within the sheath, the fluid line defining at least partially a fluid pathway. The connector can be configured to be in electrical communication with the electric line of the electric cable. The connector can include a handle portion, an interface portion coupled to or integral with the handle portion, and a pivotable member.

In various examples, the interface portion includes an electrical interface and a fluid coupling that is configured to be in fluid communication with the fluid line of the electric cable. The fluid coupling can be configured to be removably coupled with a fluid socket of an electric device or a charging station.

In various examples, the pivotable member includes an arm, the arm configured to be engageable with the fluid coupling. When the fluid coupling is coupled with the fluid socket of the electric device or the charging station, the fluid coupling can be configured to be removable from the fluid socket of the electric device or the charging station when the arm of the pivotable member is engaged with the fluid coupling. The fluid coupling can be configured to be in a locked position when the fluid coupling is coupled with the fluid socket of the electric device or the charging station and the arm of the pivotable member is disengaged with the fluid coupling.

In various examples, the fluid pathway is further defined by the fluid coupling of the connector. When the fluid coupling is coupled with the fluid socket of the electric device or the charging station, a flow of fluid is can be allowed to flow through the fluid coupling. When the fluid coupling is decoupled with the fluid socket of the electric device or the charging station, a flow of fluid can be prevented from flowing through the fluid coupling.

In various aspects, an electric charging system for charging an electric device includes a charging system comprising a reservoir, an electric cable, and a connector. The electric cable can include a sheath, an electric line positioned within the sheath, and a fluid line positioned within the sheath, the fluid line defining at least partially a fluid pathway. The connector can be mechanically coupled to the electric cable.

In various examples, the connector includes an electrical interface in electrical communication with the electric line and a fluid coupling. The fluid coupling can be configured to be coupled with a fluid socket of the electric device or the charging station. The fluid coupling can be in fluid communication with the fluid line of the electric cable and with the reservoir of the charging station. The fluid line can be a first fluid line and the fluid pathway is a first fluid pathway, wherein a second fluid line is positioned within the sheath, the second fluid line defining at least partially a second fluid pathway. The first fluid pathway, the second fluid pathway, the reservoir of the charging station, and a reservoir of the electric device can define a closed fluid circuit.

In various examples, when the fluid coupling is coupled with the fluid socket of the electric device, a fluid is allowed to flow from the reservoir of the charging station, through the fluid pathway, and to the electric device. When the fluid coupling is decoupled from the fluid socket of the electric device, a fluid may be prevented from flowing through the fluid coupling.

In various examples, the electric charging system includes a pump that is in fluid communication with the fluid pathway. The pump can be configured to cause a flow of fluid through the fluid pathway. In various examples, the fluid pathway is bidirectional.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 4:
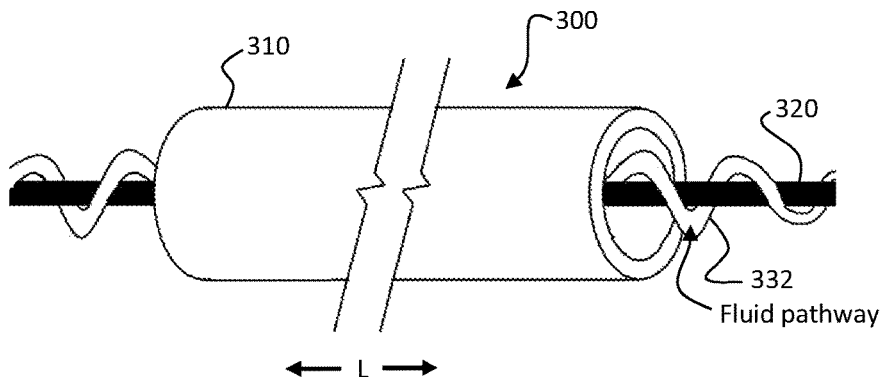

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a schematic view of an electric charging system, in accordance with an example embodiment.

FIG. 2 provides a schematic view of an electric cable, in accordance with an example embodiment.

FIG. 3 provides a schematic view of an electric cable, in accordance with an example embodiment.

FIG. 4 provides a schematic view of an electric cable, in accordance with an example embodiment.

Figure 5:
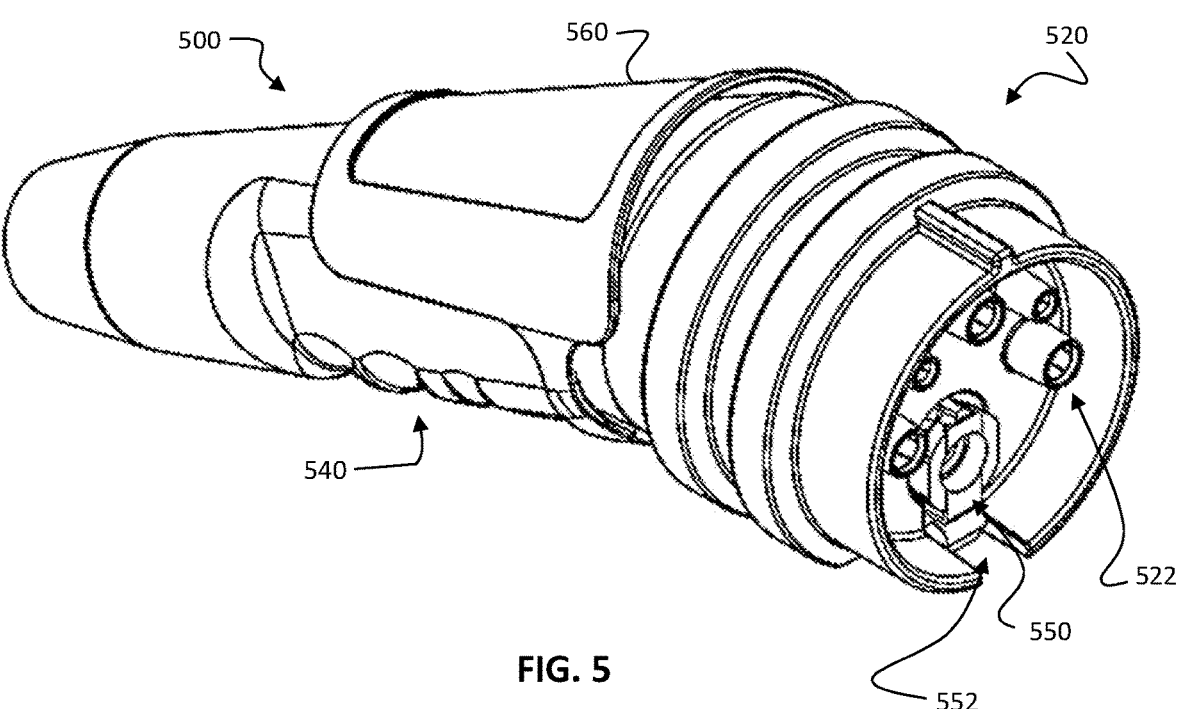

FIG. 5 provides a perspective view of a connector, in accordance with an example embodiment.

Figure 6:
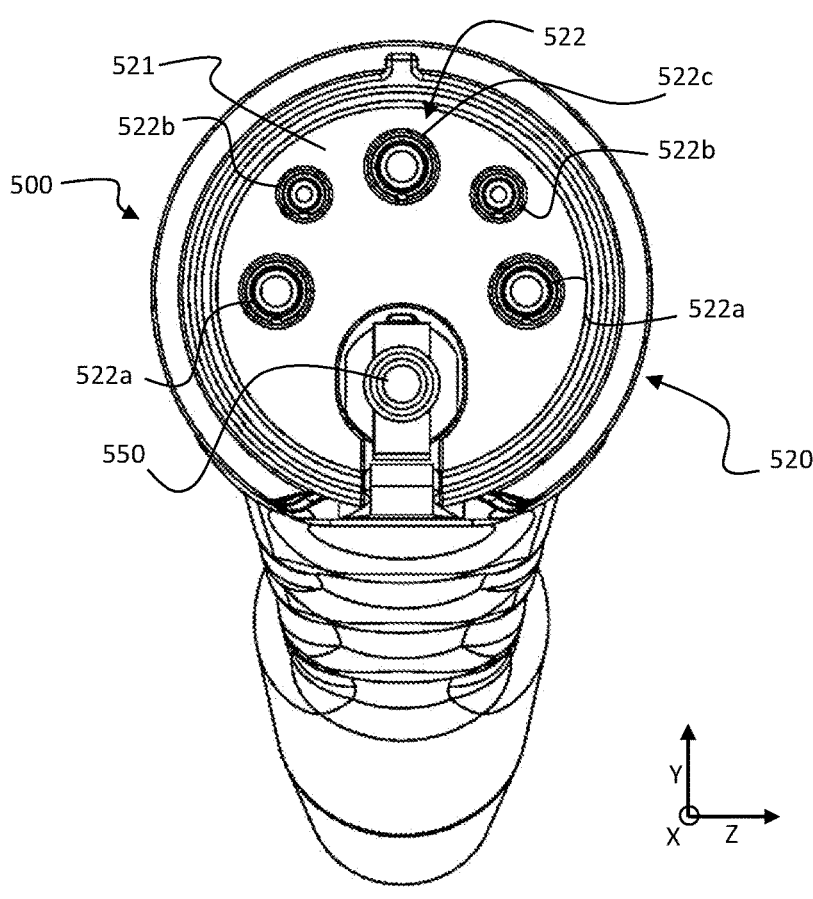

FIG. 6 provides a front view of the connector of FIG. 5, in accordance with an example embodiment.

Figure 7:
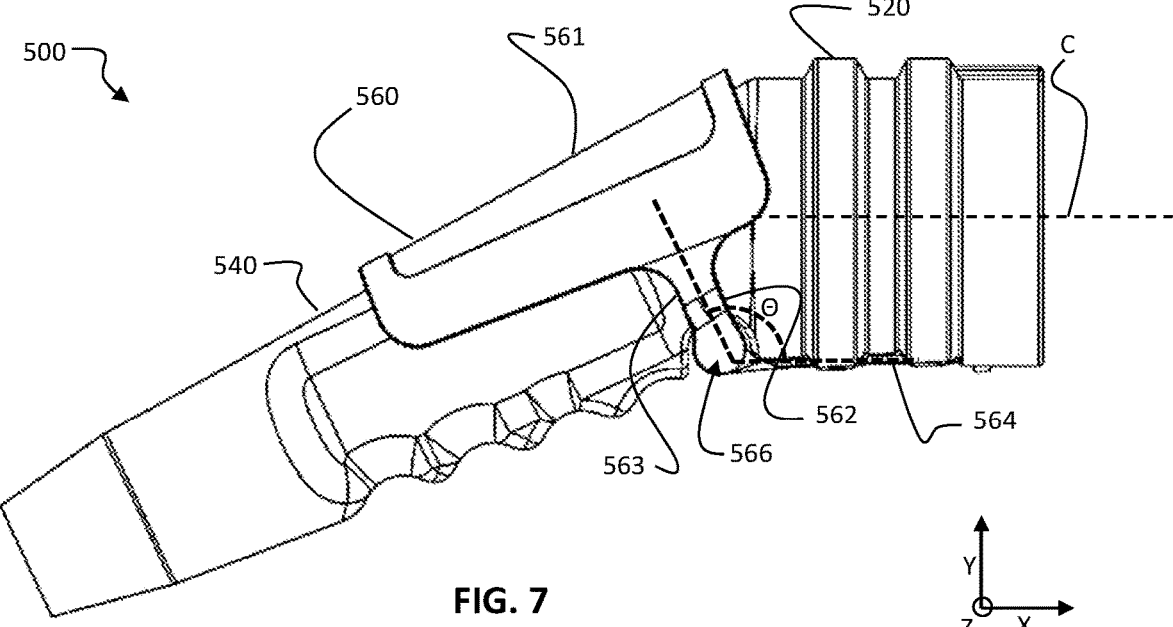

FIG. 7 provides a side view of the connector of FIG. 5, in accordance with an example embodiment.

Figure 8:
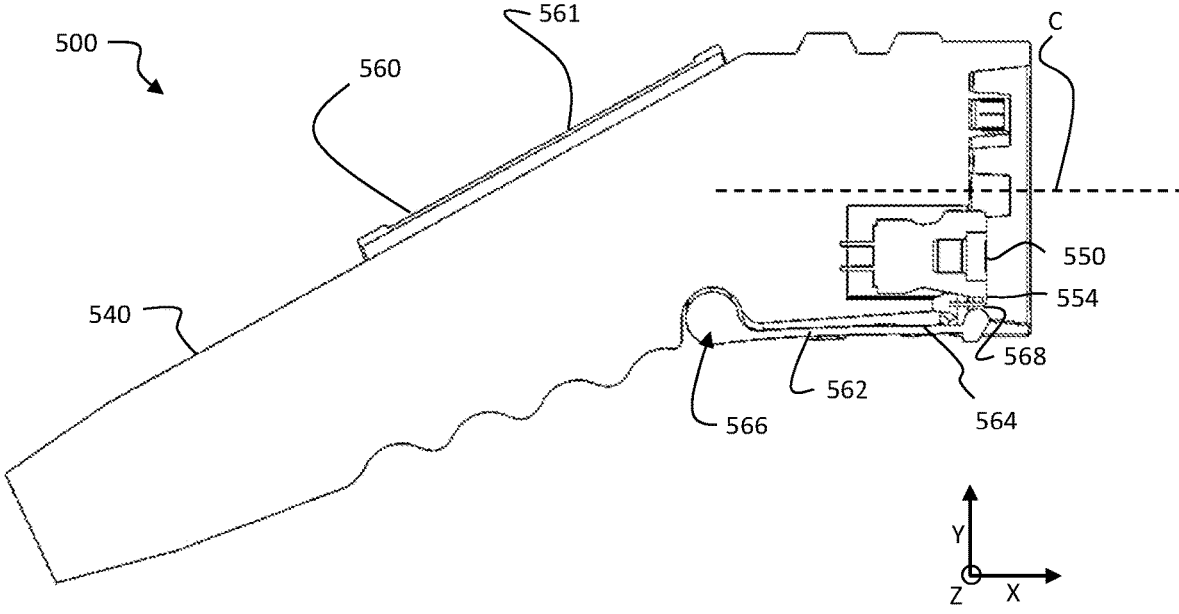

FIG. 8 provides a cross-sectional, side view of the connector of FIG. 5, in accordance with an example embodiment.

Figures 9, 10:
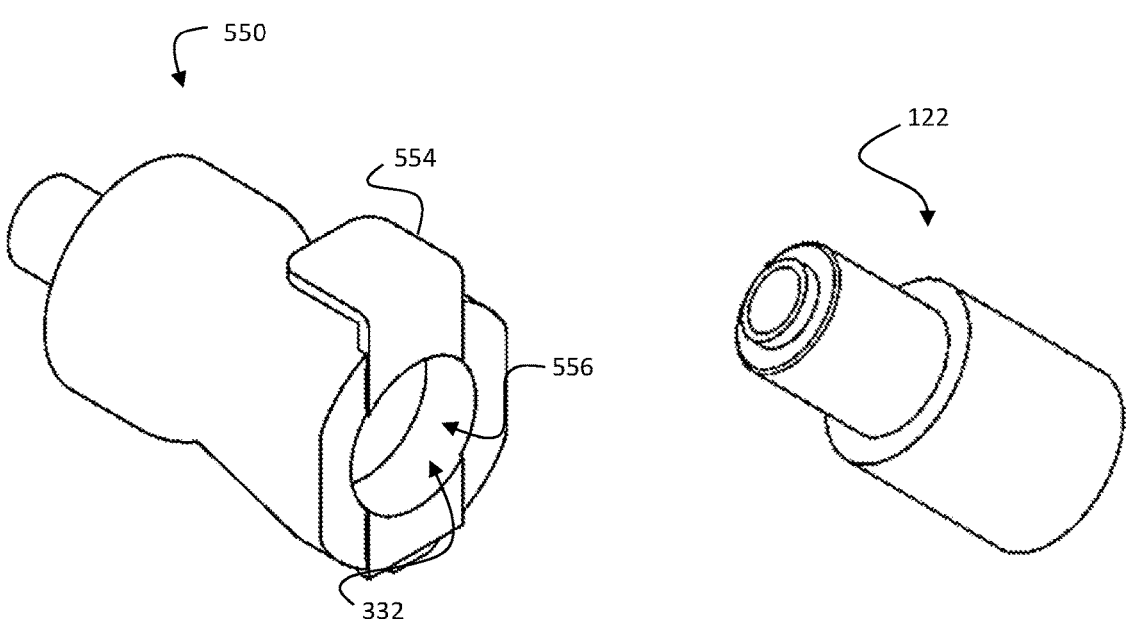

FIG. 9 provides a perspective view of a fluid coupling of the connector of FIG. 5, in accordance with an example embodiment.

FIG. 10 provides a front view of a fluid socket of an electric device, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure satisfies applicable legal requirements.

As used herein, the term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "fluid" may be a gas or a liquid. The term "fluid communication" means that a fluid is capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

Referring now to FIG. 1, a schematic view of an electric charging system 100 is provided, in accordance with an example embodiment. The electric charging system 100 can be configured to charge a battery (not shown) of an electric device 120. The electric charging system 100 can include a charging station 110 and an electric cable assembly 200. The electric charging station 110 can be a device that is configured to provide electric power. The electric cable assembly 200 can be a device that is configured to transfer electric power. For example, the cable assembly 200 can include an electric cable 300 and a connector 500. The electric cable 300 and the connector 500 can be configured to transfer electric power from the charging station 110 to the electric device 120.

The charging station 110 can include a reservoir 115 and/or the electric device 120 can include a reservoir 125. The reservoirs 115, 125 can be configured to hold a fluid, such as a liquid. In various examples, the fluid can be an oil, such as a synthetic oil (e.g., polyalphaolefin (PAO)). In various other examples, the fluid can be water. In yet other various examples, the fluid can be or include a liquid dielectric (e.g., purified water, silicone oil, perfluoro, or hydrofluoroether).

As shown, the electric device 120 can be an electric car. However, the electric device 120 can be any device or machine that includes a battery and operates fully or partially on electric power. For example, the electric device 120 can be an electric or hybrid-electric vehicle that has two wheels (e.g., an electric or hybrid-electric motorcycle or an electric or hybrid-electric moped), three wheels (e.g., an electric or hybrid-electric tricycle), or four or more wheels (e.g., an electric or hybrid-electric car, an electric or hybrid-electric truck, or an electric or hybrid-electric four-wheeler, an electric or hybrid-electric farm vehicle, an electric or hybrid-electric utility vehicle, an electric or hybrid-electric golf cart, an electric or hybrid-electric ATV, etc.). In various examples, the electric device 120 can be an aircraft. For example, the electric device 120 can be an electric or hybrid-electric airplane, an electric or hybrid-electric helicopter, or an electric or hybrid-electric drone. In various examples, the electric device 120 can be a watercraft. For example, the electric device 120 can be an electric or hybrid-electric ship or an electric or hybrid-electric boat.

As will be explained further, a fluid pathway 332 (FIGS. 2-4) can extend through the charging station 110, through the cable assembly 200, and/or through the electric device 120 to cool components of the charging station 110, the cable assembly 200, and/or the electric device 120. For example, the fluid pathway 332 can be configured to absorb heat from and cool electric components of the charging station 110, electric components of the cable 300 (e.g., an electric line 320 (FIGS. 2-4) of the cable assembly 200), electric components of the connector 500 (e.g., electrical interface 522a (FIG. 6)) of the cable assembly 200, and/or electric components of the electric device 120 (e.g., a battery of the electric device 120).

Referring now to FIG. 2, a schematic view of an electric cable 300 is provided, in accordance with an example embodiment. The electric cable 300 can define a longitudinal direction L and can include a sheath 310, an electric line 320, and a fluid line 330. As shown, the sheath 310 can circumferentially encompass the electric line 320 and the fluid line 330. The fluid line 330 can define, at least partially, a fluid pathway 332. As will be explained in more detail, the electric line 320 can be configured to be in electrical communication with the charging station 110 (FIG. 1) and/or with the electric device 120 (FIG. 1). Similarly, the fluid line 330 can be configured to be in fluid communication with the charging station 110 (FIG. 1) and/or with the electric device 120 (FIG. 1). For example, the fluid line 330 can be configured to be in fluid communication with the reservoir 115 of the charging station 110 (FIG. 1) and/or with the reservoir 125 of the electric device 120 (FIG. 1). In various examples, the fluid line 330 is in fluid communication with neither reservoir 115 nor reservoir 125 and the fluid is contained within the fluid line 330 of the cable 300.

A flow of the fluid that is within the fluid pathway 332 defined at least partially by the fluid line 330 of the cable 300 can be a convective flow. For example, when the electric line 320 of the cable 300 has current transmitting through the electric line 320, heat may be generated. This heat may be absorbed by the fluid that is within the fluid pathway 332 of the fluid line 330 of the cable 300, causing the fluid to circulate within the fluid pathway 332.

In various examples, the flow of the fluid that is within the fluid pathway 332 defined by the fluid line 330 of the cable 300 can be caused, partially or fully, by a pump (not shown). The pump can be provided within the charging station 110 and/or the electric device 120. The pump can be configured to provide suction and/or pressure to the fluid pathway 332 to cause the flow of the fluid that is within the fluid pathway 332. The pump can be configured to turn on when a temperature exceeds a threshold value and can be configured to turn off when a temperature is below a threshold value.

The temperature can be sensed by one or more temperature sensors (not shown). For example, the one or more temperature sensors can be provided within the cable assembly 200 (e.g., within the cable 300 and/or the connector 500), within the charging station 110, and/or within the electric device 120 (e.g., within the battery of the electric device 120) to sense a temperature. For example, the one or more temperature sensors can be configured to sense a temperature of the fluid within the fluid pathway 332 within the charging station 110, the cable assembly 200, and/or the electric device 120 and/or a temperature of the ambient environment within the charging station 110, the cable assembly 200, and/or the electric device 120.

As shown in the example of FIG. 2, the fluid pathway 332 defined by the fluid line 330 can be bidirectional. Stated differently, the fluid within the fluid pathway 332 can be configured to flow at least in a first direction and a second direction, the first direction and the second direction extending generally along the longitudinal direction L, in opposite directions. When the flow of the fluid within the fluid pathway 332 is provided by a pump, the pump can be configured to cause the fluid to flow towards the reservoir 125 of the electric device 120 to increase the volume of fluid within the reservoir 125 of the electric device 120. Similarly, the pump can be configured to cause the fluid to flow towards the reservoir 115 of the charging station 110 to increase the volume of fluid within the reservoir 115 of the charging station 110.

The direction of the flow of fluid within the fluid pathway 332 can be determined based on the temperature sensed by the one or more temperature sensors that can be provided within the cable assembly 200, within the charging station 110, and/or within the electric device 120. For example, if it is determined that a temperature sensed by at least one of the temperature sensors within the electric device 120 exceeds a threshold value, the pump can cause the flow of fluid within the fluid pathway 332 to flow from the electric device 120 to the charging station 110. Similarly, if it is determined that a temperature sensed by at least one of the temperature sensors within the charging station 110 exceeds a threshold value, the pump can cause the flow of fluid within the fluid pathway 332 to flow from the charging station 110 to the electric device 120.

In various examples, the direction of the flow of fluid within the fluid pathway 332 can be determined based on a volume of fluid within the reservoir 115 of the charging station 110 and/or the reservoir 125 of the electric device 120. For example, if it is determined that a volume of fluid within the reservoir 115 of the charging station 110 exceeds a threshold value and/or is reaching a volume capacity (e.g., exceeds at least 95 percent of the volume capacity), the pump can cause the flow of fluid within the fluid pathway 332 to flow from the charging station 110 to the electric device 120. Similarly, if it is determined that a volume of fluid within the reservoir 125 of the device 120 exceeds a threshold value and/or is reaching a volume capacity (e.g., exceeds at least 95 percent of the volume capacity), the pump can cause the flow of fluid within the fluid pathway 332 to flow from the electric device 120 to the charging station 110.

Referring now to FIG. 3, a schematic view of an electric cable 300 is provided, in accordance with an example embodiment. The electric cable 300 of FIG. 3 can be configured similarly to, or the same as, the cable 300 of FIG. 2. However, in this example, the cable 300 includes a plurality of fluid lines 330 (e.g., two, three, four, or five fluid lines 330). In this example, the cable 300 includes a first fluid line 330a and a second fluid line 330b. The first fluid line 330a can define a first fluid pathway 332a. The second fluid line 330b can define a second fluid pathway 332b.

As shown in the example of FIG. 3, the first fluid pathway 332a defined by the first fluid line 330a and the second fluid pathway 332b defined by the second fluid line 330b can each be unidirectional. Also, as shown, the fluid within the first fluid pathway 332a can be configured to flow in a first direction and the fluid within the second fluid pathway 332b can be configured to flow in a second direction, the first direction and the second direction extending generally along the longitudinal direction L, in opposite directions. The flow of fluid within the first fluid pathway 332a and the flow of fluid within the second fluid pathway 332b can be provided by one or more pumps. However, in various other examples, the flow of fluid within the first fluid pathways 332a and the flow of fluid within the second fluid pathway 332b can be a convection flow.

Still referring to the example of FIG. 3, the fluid within the first fluid pathway 332a and the second fluid pathway 332b can circulate from the charging station 110 (e.g., from the reservoir 115 of the charging station 110), through the cable assembly 200 (e.g., through the cable 300 and the connector 500), to the electric device 120 (e.g., to the reservoir 125 of the electric device 120), and then back through the cable assembly 200 and back to the charging station 110 (e.g., cycle back to the reservoir 115 of the charging station 110). Stated differently, at least the first fluid pathway 332a and the second fluid pathway 332b can define a closed fluid circuit or loop. In various examples, the first fluid pathway 332a, the second fluid pathway 332b, the reservoir 115 of the charging station 110, and the reservoir 125 of the electric device 120 define the closed fluid circuit.

In various examples, each of the first fluid pathway 332a and the second fluid pathway 332b can be provided with a pump and a flow rate of the fluid within the first fluid pathway 332a and the second fluid pathway 332b can be controlled separately by the pumps. However, in other examples, one or more pumps can be provided to provide a flow of fluid within the first fluid pathway 332a and the second fluid pathway 332b. The flow rate of the fluid within the first fluid pathway 332a and the second fluid pathway 332b can be determined based on cooling needs of components within the charging station 110, the cable assembly 200 and/or the electric device 120. For example, if it is determined that a temperature sensed by a temperature sensor within the charging station 110, the cable assembly 200, and/or the electric device 120 exceeds a threshold value, the flow rate of the fluid within the first fluid pathway 332a and/or the second fluid pathway 332b can be increased to provide for additional cooling and/or to refill a reservoir, such as when the fluid in a vehicle is determined to be low, additional fluid flow into the vehicle reservoir may flow until the volume reaches or exceeds a threshold value, at which time the fluid flow may regulate to a consistent even flow into and out of the vehicle and charging station.

Referring now to FIG. 4, a schematic view of an electric cable 300 is provided, in accordance with an example embodiment. The electric cable 300 can be configured similarly to, or the same as, the electric cable 300 of FIG. 2 or FIG. 3. In this example, the fluid line 330 can be generally helix-shaped or generally spiral-shaped. As shown, the fluid line 330 can wrap around the electric line 320. Wrapping the fluid line 330 around the electric line 320 may provide for additional heat transfer from the electric line 320 to the fluid pathway 332 of the fluid line 330 due to the additional surface area of the fluid line 330 at each point along the electric line 320 along the longitudinal direction L.

Referring now to FIG. 5, a perspective view of a connector 500 is provided, in accordance with an example embodiment. The connector 500 can be configured to be in electrical communication with at least one of the electric cable 300 (FIGS. 2-4), the charging station 110, and/or the electric device 120 (e.g., with the battery of the electric device 120). The connector 500 can be coupled to, or integral with, the cable 300. The connector 500 can be selectively coupled to the electric device 120 and/or the charging station 110, which will be explained in further detail.

The connector 500 can include a handle portion 540 and an interface portion 520. The interface portion 520 can be coupled to or integral with the handle portion 540. The interface portion 520 can include at least one interface 522 and at least one fluid coupling 550 (e.g., one, two, three, four or more fluid couplings 550). The interface portion 520 of the connector 500 can include a keying feature 552, which can be configured to mate with a corresponding keying feature (not shown) on the electric device and/or the charging station, which may ensure alignment of the at least one interface 522 and the at least one fluid coupling 550 with corresponding sockets of the electric device. The connector 500 can also include a pivotable member 560.

Referring now to FIG. 6, a front view of the connector 500 of FIG. 5 is provided, in accordance with an example embodiment. As best seen in this view, the interface portion 520 can define a face 521. The face 521 of the connector 500 can define an X direction (in and out of page), a Y direction that is orthogonal to the X direction, and a Z direction that is orthogonal to the X direction and the Y direction. The face 521 of the interface portion 520 can extend generally along a plane defined by the Y direction and the Z direction.

As mentioned, the interface portion 520 of the connector 500 can include at least one interface 522. Each of the at least one interface 522 can extend from the face 521 in the X direction. Also, each of the at least one interface 522 can be engageable with and coupled to a corresponding socket (not shown) of the electric device 120 (FIG. 1) or the charging station 110 (FIG. 1). The at least one interface 522 can be, or include, an electrical interface 522a, a communication interface 522b, and/or a ground interface 522c. In this example, the at least one interface 522 includes two electrical interfaces 522a, two communication interfaces 522b, and a ground interface 522c. However, the at least one interface 522 can include any number of electrical interfaces 522a, communication interfaces 522b, and ground interfaces 522c.

In various examples, the at least one interface 522 is, or includes, the electrical interface 522a. The electrical interface 522a can be in electrical communication with the electric line 320 of the cable 300 (FIGS. 2-4). For example, the electrical interface 522a can be electrically coupled to, or electrically integral with, the electric line 320 of the cable 300. The electrical interface 522a can be configured to be engageable with and coupled to an electrical socket (not shown) of the electric device 120 (FIG. 1) or the charging station 110 (FIG. 1). In various examples, the electrical interface 522a can be configured to be slidingly engageable with the electrical socket of the electric device 120.

As mentioned, the interface portion 520 of the connector 500 can include at least one fluid coupling 550. The fluid coupling 550 can be in fluid communication with the fluid line 330 of the cable 300 (FIGS. 2-4) of the cable assembly 200 (FIG. 1). Also, the fluid pathway 332 can extend through the fluid line 330 of the cable 300 and through the fluid coupling 550. As will be explained further, the fluid coupling 550 can be configured to be engageable with and coupled to a fluid socket 122 (FIG. 10) of the electric device 120 or the charging station 110.

Although not shown, the interface portion 520 of the connector 500 can include two or more fluid couplings 550. For example, and with reference to FIG. 3, a first fluid coupling 550 can be in fluid communication with the first fluid line 330a of the cable 300 and a second fluid coupling 550 can be in fluid communication with the second fluid line 330b of the cable 300.

Referring now to FIGS. 7 and 8, a side view (FIG. 7) and a cross-sectional, side view (FIG. 8) of the connector 500 of FIG. 5 are provided, in accordance with an example embodiment. As mentioned, the connector 500 can include a pivotable member 560. Such as illustrated in FIG. 7, the pivotable member 560 can include a palm rest 561 that is positioned over the handle portion 540 of the connector 500. A biasing member (not shown) can be provided between the palm rest 561 of the pivotable member 560 and the handle portion 540 of the connector 500 to apply a pushing force to the pivotable member 560.

The pivotable member 560 can include an arm 562 that extends from the palm rest 561. The arm 562 of the pivotable member 560 can have a first portion 563 that extends from the palm rest 561 and a second portion 564 that extends from the first portion 563. An angle θ can be defined between the first portion 563 and the second portion 564 of the arm 562 of the pivotable member 560. In various examples, the angle θ can be at least 45 degrees and up to 135 degrees, such as at least 90 degrees and up to 135 degrees. Such as illustrated in FIG. 8, the second portion 564 of the arm 562 can include a contact portion 568. The contact portion 568 can extend from the second portion 564 and toward a centerline C of the interface portion 520 of the connector 500.

Such as illustrated in FIG. 8, the fluid coupling 550 of the connector 500 can include an actuating member 554. In various examples, the contact portion 568 of the arm 562 of the pivotable member 560 can be configured to be engageable with the actuating member 554 of the fluid coupling 550. For example, the contact portion 568 of the arm 562 of the pivotable member 560 can be configured to exert a pushing force on the actuating member 554 of the fluid coupling 550.

The pivotable member 560 can be configured to pivot on a pivot point 566. The pivot point 566 can be defined between the first portion 563 and the second portion 564 of the arm 562 of the pivotable member 560. Also, the pivot point 566 can be positioned on or proximate to the interface portion 520 of the connector 500, on or proximate to the handle portion 540 of the connector 500, or at a location that is proximate to an area that is between the handle portion 540 and the interface portion 520. In various examples, the pivotable member 560 is pivotably coupled to the handle portion 540, the interface portion 520, or an area between the handle portion 540 and the interface portion 520 of the connector 500.

As mentioned, the connector 500 can include a biasing member (not shown) that is positioned between the palm rest 561 and the handle portion 540. The biasing member can cause the pivotable member 560 to pivot circumferentially on the pivot point 566 (e.g., circumferentially in a clockwise direction, in the FIG. 7 view). More specifically, the biasing member can cause the contact portion 568 of the pivotable member 560 to move away from the actuating member 554 of the fluid coupling 550. In this way, the biasing member can automatically disengage the contact portion 568 of the pivotable member 560 from the actuating member 554 of the fluid coupling 550. As used herein, the term "disengage" does not necessarily mean separation of one object from another. For example, when the contact portion 568 of the pivotable member 560 is disengaged from the actuating member 554 of the fluid coupling 550, the actuating member 554 of the fluid coupling 550 is allowed to move away from its most inward position.

Referring now to FIG. 9, a perspective view of the fluid coupling 550 of the connector 500 of FIG. 5 is provided, in accordance with an example embodiment. As seen in this view, the fluid coupling 550 can define an opening 556. The opening 556 of the fluid coupling 550 can further define the fluid pathway 332 that is defined by the fluid line 330 of the cable 300 (FIGS. 2-4).

Referring now to FIG. 10, a front view of the fluid socket 122 of the electric device 120, in accordance with an example embodiment. As previously mention, the fluid coupling 550 (FIG. 9) can be configured to be coupled with the fluid socket 122 of the electric device 120 or the charging station 110. More specifically, the fluid coupling 550 can be configured to be slidingly engageable with and coupled to the fluid socket 122 of the electric device 120 or the charging station 110.

Referring now to FIG. 9 and FIG. 10, the fluid coupling 550 can be configured to be removably coupled with (e.g., capable of being decoupled) from the fluid socket 122 when the actuating member 554 is in a first position and configured to prevent decoupling from the fluid socket 122 when the actuating member 554 is in a second position. For example, the fluid coupling 550 can be configured to be removably coupled with the socket of the electric device 120 or the charging station 110 when the actuating member 554 of the fluid coupling 550 is pushed inward, towards a center of the fluid coupling 550. As used herein, the word 'decouplable' or the phrase 'removably coupled', and the like, means that one object can be decoupled from another object, such as with a relatively small amount of force. For example, an object that is decouplable from or removably coupled with another object can be decoupled by the force exerted by a user's hand.

The fluid coupling 550 can be configured to prevent the fluid coupling 550 from being decoupled from the socket of the electric device 120 or the charging station 110 when the actuating member 554 of the fluid coupling 550 is allowed to move outwards, away from a center of the fluid coupling 550. As used herein, the phrase 'prevent decoupling', and the like, means that one object is difficult to decouple from another object. For example, an object that is prevented from decoupling with another object is difficult, or impossible, to decouple by the force exerted by a user's hand, such as pulling by hand, an accidental tripping, or the like.

In various examples, when the fluid coupling 550 prevents the fluid coupling 550 from being decoupled from the socket of the electric device 120 or the charging station 110, the fluid coupling 550 also prevents the connector 500 from being decoupled from the electric device 120 or the charging station 110. Also, when the fluid coupling 550 allows the fluid coupling 550 to be decoupled from the socket of the electric device 120 or the charging station 110, the fluid coupling 550 also allows the connector 500 to be decoupled from the electric device 120 or the charging station 110.

In various examples, the fluid coupling 550 can be configured as a drip-less fluid coupling 550. For example, the fluid coupling 550 can be configured to prevent fluid from entering or exiting the opening 556 of the fluid coupling 550 when the fluid coupling 550 is not coupled with the fluid socket 122. Similarly, the fluid coupling 550 can be configured to allow fluid from entering and/or exiting the opening 556 of the fluid coupling 550 when the fluid coupling 550 is coupled to the fluid socket 122.

Referring now also to FIG. 5, the connector 500 can be coupled with an electric device 120 by pushing the connector 500 towards the sockets (e.g., fluid socket 122 of FIG. 10) of the electric device 120. Once coupled, the fluid coupling 550 may lock the connector 500 to the electric device 120. After the fluid coupling 550 is coupled with the fluid socket 122 of the electric device 120, the fluid is allowed to flow to or from the charging station 110, through the cable assembly 200, and to or from the electric device 120. Allowing the fluid to flow to or from the charging station 110, through the cable assembly 200, and to or from the electric device 120 may increase the amount of heat absorbed from one or more components of the charging station 110, the cable assembly 200, or the electric device 120, which increases the amount of cooling of those components.

When it is desired to decouple the connector 500 from the electric device 120, a user can squeeze the palm rest 561 of the pivotable member 560 (e.g., relatively downward in FIG. 7) towards the handle portion 540 of the connector 500. The relative downward movement of the palm rest 561 can cause the contact portion 568 of the arm 562 of the pivotable member 560 to move relatively upward towards the actuating member 554 of the fluid coupling 550. With sufficient force from the contact portion 568 of the arm 562 onto the actuating member 554 of the fluid coupling 550, the actuating member 554 is pushed inwards, towards a center of the fluid coupling 550. Pushing the actuating member 554 inwards may unlock the fluid coupling 550 and the connector 500 from the sockets (e.g., fluid socket 122 of FIG. 10) of the device 120, making the fluid coupling 550 and the connector 500 decouplable from the sockets. Additionally, pushing the actuating member 554 inwards may prevent a fluid from flowing in or out of the fluid coupling 550. After the actuating member 554 is pushed inwards, the connector 500 can then be decoupled from the electric device 120, such as by pulling the connector 500 away from engagement with the electric device 120. The fluid coupling 550 may prevent a fluid from flowing in or out of the fluid coupling 550 after the connector 500 is decoupled from the electric device 120.

Preventing a fluid from flowing in or out of the fluid coupling 550 when the actuating member 554 of the fluid coupling 550 is moved inwards or when the fluid coupling 550 is decoupled from the fluid socket 122 has many benefits. For example, this configuration may increase the safety for the user of the connector 500, the cable 300, and/or the charging system by reducing the chance of electric shock from the fluid. Also, this configuration may increase the user experience for a user using the connector 500, the cable 300, and/or the charging system, such as by preventing user irritation and/or anxiety caused by fluids near or on the connector, the cable 300, and/or the charging system. Additionally, this configuration may reduce the negative environmental impact of the connector 500, the cable 300, and/or the charging system by preventing potentially harmful fluids from escaping the connector 500, the cable 300, and/or the charging system.

CONCLUSION

The above descriptions of various embodiments of the subject disclosure and corresponding figures and what is described in the Abstract, are provided and described herein for illustrative purposes and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An electric cable assembly comprising:
an electric cable; and
a connector that is configured to be in electrical communication with the electric cable, the connector comprising:
an interface portion comprising:
an electrical interface; and
a fluid coupling configured to be coupled with a fluid socket of an electric device or a charging station; and
a pivotable member comprising an arm, the arm configured to be engageable with the fluid coupling,
wherein when the fluid coupling is coupled with the fluid socket of the electric device or the charging station, the fluid coupling is configured to be decouplable from the fluid socket of the electric device or the charging station when the arm of the pivotable member is engaged with the fluid coupling.

2. The electric cable assembly of claim 1, wherein when the fluid coupling is removed from the fluid socket of the electric device or the charging station, the fluid coupling prevents a fluid from flowing through an opening of the fluid coupling.

3. The electric cable assembly of claim 1, wherein the fluid coupling is configured to be in a locked position when the fluid coupling is coupled with the fluid socket of the electric device or the charging station.

4. The electric cable assembly of claim 1, wherein the fluid coupling comprises an actuating member, wherein when the arm of the pivotable member is engaged with the fluid coupling, the arm of the pivotable member exerts a force on the actuating member.

5. The electric cable assembly of claim 1, further comprising a biasing member to apply a force to the pivotable member to automatically disengage the arm of the pivotable member from the fluid coupling.

6. The electric cable assembly of claim 1, wherein the arm of the pivotable member comprises a first portion and a second portion, wherein an angle is defined between the first portion and the second portion, wherein the angle is at least 45 degrees and up to 135 degrees.

7. The electric cable assembly of claim 6, wherein the arm of the pivotable member further comprises a contact portion, wherein the contact portion extends from the second portion and toward a centerline of the interface portion of the connector.

8. The electric cable assembly of claim 7, wherein the fluid coupling comprises an actuating member, wherein the contact portion is configured to be engageable with the actuating member.

9. The electric cable assembly of claim 1, wherein the fluid coupling comprises an actuating member, wherein the arm of the pivotable member is configured to be engageable with the actuating member.

10. The electric cable assembly of claim 7, wherein the fluid coupling comprises an actuating member, wherein the contact portion is configured to be engageable with the actuating member.

11. An electric cable assembly comprising:
an electric cable comprising:
a sheath;
an electric line positioned within the sheath; and
a fluid line positioned within the sheath, the fluid line defining at least partially a fluid pathway; and
a connector that is configured to be in electrical communication with the electric line of the electric cable, the connector comprising:
an interface comprising:
an electrical interface; and
a fluid coupling that is configured to be in fluid communication with the fluid line of the electric cable, the fluid coupling configured to be removably coupled with a fluid socket of an electric device or a charging station; and
a pivotable member comprising an arm, the arm configured to be engageable with the fluid coupling,
wherein when the fluid coupling is coupled with the fluid socket of the electric device or the charging station, the fluid coupling is configured to be removable from the fluid socket of the electric device or the charging station when the arm of the pivotable member is engaged with the fluid coupling.

12. The electric cable assembly of claim 11, wherein the fluid coupling is configured to be in a locked position when the fluid coupling is coupled with the fluid socket of the electric device or the charging station and the arm of the pivotable member is disengaged with the fluid coupling.

13. The electric cable assembly of claim 11, wherein when the fluid coupling is coupled with the fluid socket of the electric device or the charging station, a flow of fluid is allowed to flow through the fluid coupling.

14. The electric cable assembly of claim 11, wherein when the fluid coupling is decoupled with the fluid socket of the electric device or the charging station, a flow of fluid is prevented from flowing through the fluid coupling.

15. An electric charging system for charging an electric device,
the electric charging system comprising:
a charging station comprising a reservoir;
an electric cable comprising:
a sheath;
an electric line positioned within the sheath; and
a fluid line positioned within the sheath, the fluid line defining at least partially a fluid pathway; and
a connector that is mechanically coupled to the electric cable, wherein the connector comprises:
an electrical interface in electrical communication with the electric line;
a fluid coupling configured to be coupled with a fluid socket of the electric device or the charging station, the fluid coupling being in fluid communication with the fluid line of the electric cable and with the reservoir of the charging station-; and
a pivotable member comprising an arm, the arm configured to be engageable with the fluid coupling,
wherein when the fluid coupling is coupled with the fluid socket of the electric device or the charging station, the fluid coupling is configured to be removable from the fluid socket of the electric device or the charging station when the arm of the pivotable member is engaged with the fluid coupling.

16. The electric charging system of claim 15, wherein the fluid line is a first fluid line and the fluid pathway is a first fluid pathway, wherein a second fluid line is positioned within the sheath, the second fluid line defining at least partially a second fluid pathway.

17. The electric charging system of claim 16, wherein the first fluid pathway, the second fluid pathway, the reservoir of the charging station, and a reservoir of the electric device define a closed fluid circuit.

18. The electric charging system of claim 15, wherein when the fluid coupling is coupled with the fluid socket of the electric device, a fluid is allowed to flow from the reservoir of the charging station, through the fluid pathway, and to the electric device.

19. The electric charging system of claim 15, wherein when the fluid coupling is decoupled from the fluid socket of the electric device, a fluid is prevented from flowing through the fluid coupling.

20. The electric charging system of claim 15, further comprising a pump that is in fluid communication with the fluid pathway, wherein the pump is configured to cause a flow of fluid through the fluid pathway.

* * * * *